United States Patent [19]

Thompson

[11] 4,108,332
[45] Aug. 22, 1978

[54] FIRE PROTECTIVE GREASE CATCHER

[76] Inventor: Anita L. Thompson, 250 Boxer Dr., Reno, Nev. 89512

[21] Appl. No.: 747,389

[22] Filed: Dec. 3, 1976

[51] Int. Cl.² .................. B65D 51/16; B65D 25/00
[52] U.S. Cl. ............................ 220/370; 220/372; 220/88 A
[58] Field of Search ............ 220/370, 369, 372, 88 A, 220/287, 8; 55/384

[56] References Cited

U.S. PATENT DOCUMENTS

| 383,024 | 5/1888 | Stork | 220/287 |
| 2,530,911 | 11/1950 | Schultz | 220/287 X |
| 2,619,250 | 11/1952 | Haberstump | 220/8 |
| 2,664,169 | 12/1953 | Misener et al. | 220/369 X |
| 2,760,672 | 8/1956 | Cronheim | 220/369 X |
| 3,110,412 | 11/1963 | Curry, Jr. | 220/287 |
| 3,358,872 | 12/1967 | Johnson | 220/370 |
| 3,363,406 | 1/1968 | Miller | 55/384 |

Primary Examiner—William Price
Assistant Examiner—Steven M. Pollard
Attorney, Agent, or Firm—Herbert C. Schulze

[57] ABSTRACT

This invention is a disposable cover in combination with a framework, adjustable so as to accommodate various sizes of frying pans or the like, the purpose of which is to prevent grease or the like, from spattering outside of a frying pan or the like, when being used for frying foods.

5 Claims, 11 Drawing Figures

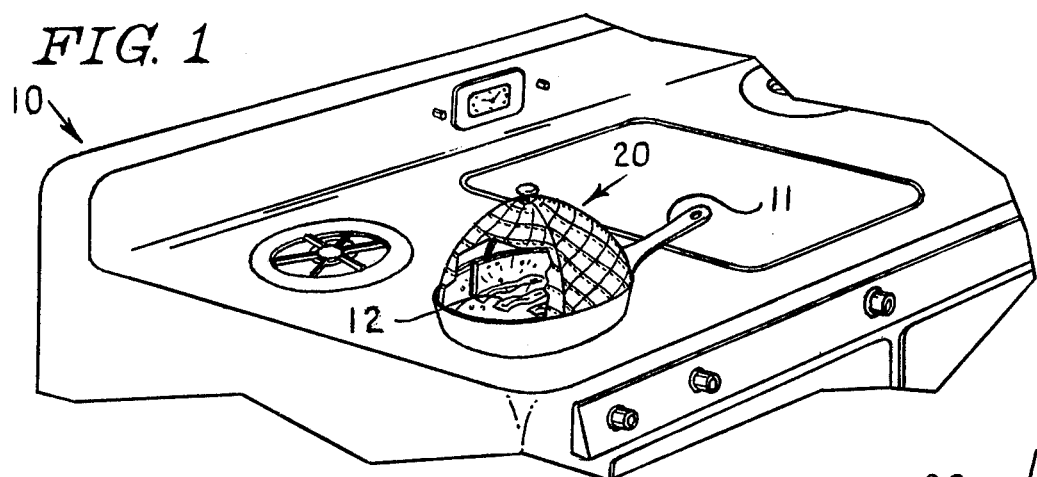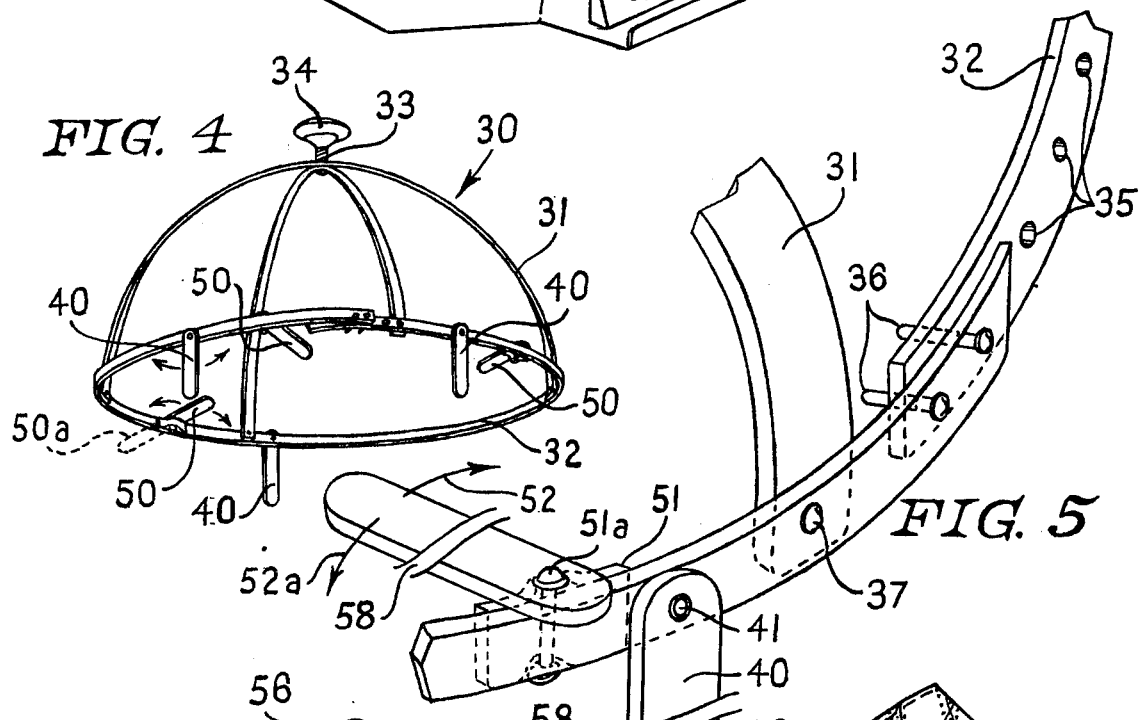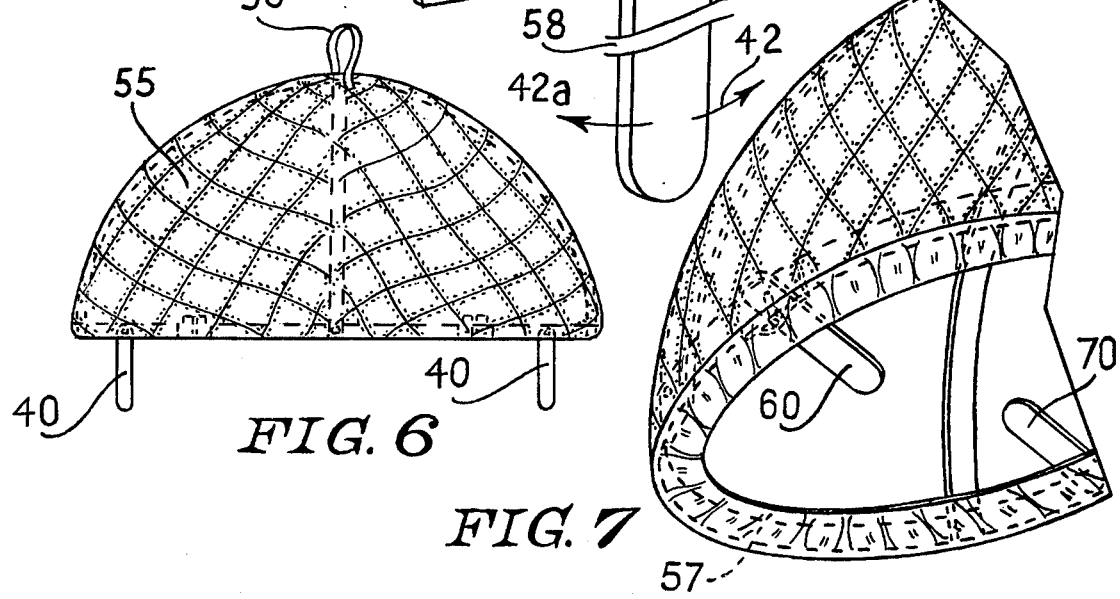

FIRE PROTECTIVE GREASE CATCHER

CROSS REFERENCE TO RELATED PATENT APPLICATIONS

There are no patent applications filed by me which are related to this patent application.

BACKGROUND OF THE INVENTION

1. FIELD OF THE INVENTION

This invention is in the general field of cooking utensils and is more particularly directed to a cover whick is placed over foods that tend to splatter grease or juices when the foods are heated or cooked. One who prepares meats, of the like, is familiar with the splattering which takes place in the process of frying or broiling meats, or the like. The cover material is resilient in nature, fireproof, non-heat conductive, and can be disposed of. Supporting framework is adjustable in size so as to be used for covering cooking utensils of various sizes.

2. DESCRIPTION OF THE PRIOR ART

There are various kinds of covers which are placed over foods so as to catch splatterings when the foods are being fried or broiled. Those skilled in the art are familiar with metal covers which are placed over the item being fried or broiled. The metal is cumbersome, relatively expensive, designed to fit a given configuration of a frying pan, or the like and the metal cover becomes very hot during the cooking process. The present invention features a resilient type disposable cover made from a material which is heat non-conductive so there is no danger of one receiving a burn if the cover is accidently touched. The framework is adjustable so as to fit various sizes of cooking utensils, further, the framework may include adjustable legs to that the framework can be elevated with reference to the bottom of the frying pan, or the utensil being used. In these respects, there is no prior art.

SUMMARY OF THE INVENTION

One who broils or fries meats, or the like is well familiar with the fact that the splattering of grease or juices is undesirable since a cleanup job is always necessary, and the possibility of receiving burns caused by the splattering of hot grease is an ever present danger; also, fire may result.

I have invented a cover and framework which will economically eliminate the problems caused by the splattering. A disposable cover is made of a fireproof resilient material, and after use, the material is thrown away. Since the material is non-heat conductive there is no danger of being burned if one should accidently touch the cover material during its use. One design of the cover includes a dewn in loop of the same non-conductive material so that one can lift the unit without the danger of receiving burns.

The framework assembly, which holds the cover, is made from a light weight heat resistant and flexible material such as metal or certain types of plastic. Arms which swivel in a horizontal plain may be mounted on the base element of the framework so that the element can be placed over a smaller or larger perimeter cooking utensil. This operation will be fully explained in the Description of a Preferred Embodiment.

When the framework and cover are allowed to rest directly on the bottom of the pan, some grease may tend to soak the cover material. In one embodiment, adjustable legs are mounted upon the framework to enable elevation of the framework if it is not desired to have it rest on the cooking utensil.

The base frame of the framework assembly may include means to increase or decrease the perimeter of the element. This capability, by use of the swivel arms, will allow use with cooking utensils of various sizes.

Arching members will be attached to the base element in an inverted position so as to complete the framework assembly in an enclosure fashion and the arching members will be joined at some point above the axis of the base element. In one embodiment, there can be a bolt with threads pointing upward and being exposed, while attaching the arching members. A non-conductive element can be cooperatively mounted on the threaded bolt and thereby serve as a handle for the unit. Also, one arching member could contain a loop for the purpose of forming a lifting ring.

As previously mentioned, the disposable cover may have a loop sewn at the top of the cover and serve as an alternative method for lifting the assembly. Elastic bands, strings, or the like, will serve as a means for holding the disposable cover on the framework.

It is an object of this invention to provide a disposable cover material which is used to catch splatterings from foods, or the like, which are being cooked;

Another object of this invention is to provide a framework assembly which has an adjustable base element so that the perimeter of the base element can be changed;

A further object of this invention is to provide arms which can swivel horizontally on the base element so as to allow the unit to be used on frying pans, or other cooking utensils, of varying sizes; and, Another object of this invention is to provide adjustable legs on the base element wherein the assembly can be elevated with respect to the bottom of the cooking utensil.

The foregoing and other objects and advantages of this invention will become clear to those skilled in the art upon reading the description of a preferred embodiment which follows.

BRIEF DESCRIPTION OF THE DRAWINGS

FIG. 1 is a partial perspective showing the food cover assembly in use;

FIG. 4 is a perspective of an alternate construction of framework illustrating additional features;

FIG. 5 is an enlarged perspective of a portion of FIG. 4 showing in more detail certain features;

FIG. 6 is an elevational view of the embodiment of FIG. 4 with a cover in place;

FIG. 7 is an enlarged perspective of a portion of the embodiment of FIG. 4 with the cover in place;

DESCRIPTION OF A PREFERRED EMBODIMENT

In FIG. 1, a partial perspective view is shown of a frying pan 11 and a cover assembly 20 resting on stove 10. Without use of the cover assembly 20, meat 12, or the like, which is being fried, will splatter grease or jices and give rise to the danger of one being burned by hot grease. Naturally, there is also a clean-up problem.

Figure 2:
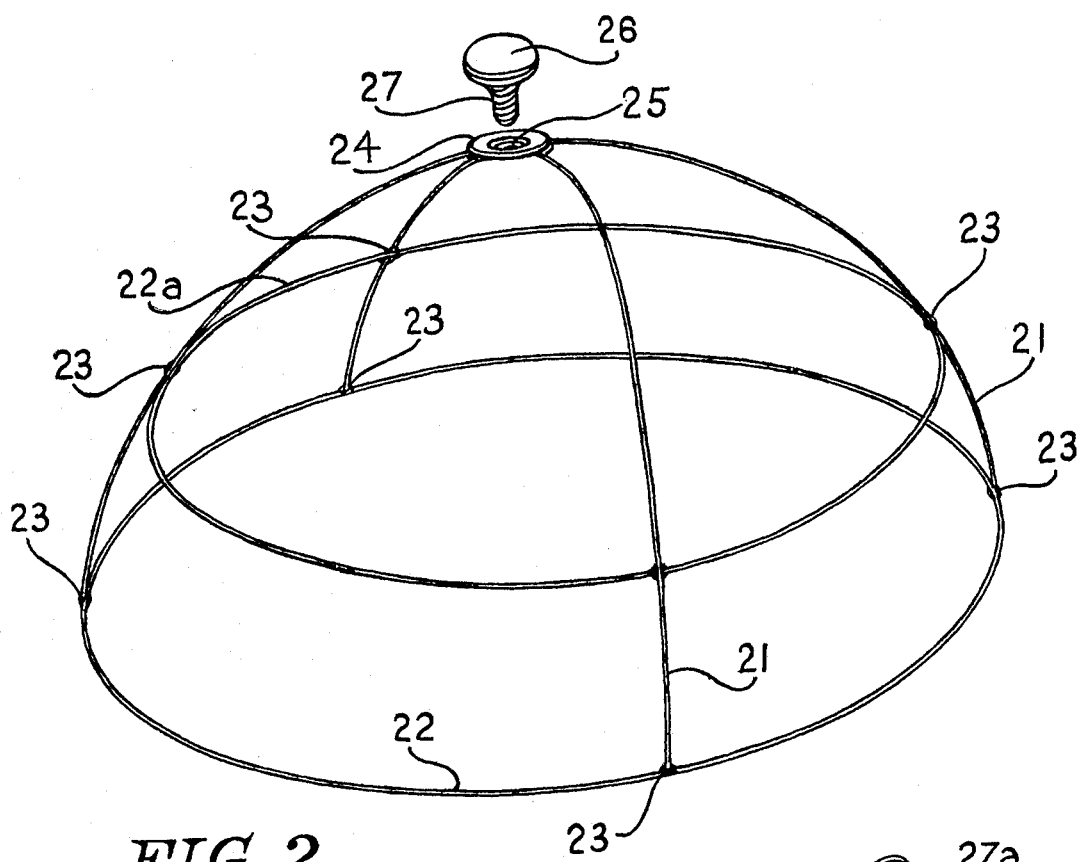
FIG. 2 is a perspective showing a preferred framework and lifting knob for the apparatus of this invention.

FIG. 2 illustrates a preferred embodiment of the framework for this device. It is to be observed that the framework comprises a pair of essentially semi-circular numbers 21, each made of wire of suitable strength to support the fabric cover and remain relatively rigid. These wire are joined by spot welding or the like, to a nut or the like 24, having threaded interior hole 25.

A bottom hoop 22 of wire similar to that of the element 21 is spot welded to the element 21 at point 23 as illustrated. An intermediate hoop maybe disposed at 22a essentially intermediate the base hoop 22 and the top connection at 24 for additional strength. Such intermediate hoop will also tend to maintain the cover, which will be described later in a more uniform condition over the frame. This hoop, it will be noted, is also spot welded at element 23 by means known to those skilled in the art.

The knob 26 having a threaded stem 27 is shown at a distance from the framework. The threaded stem 27 on the knob 26 will be so adapted as to screw into the threaded hole 25.

Figure 2A:
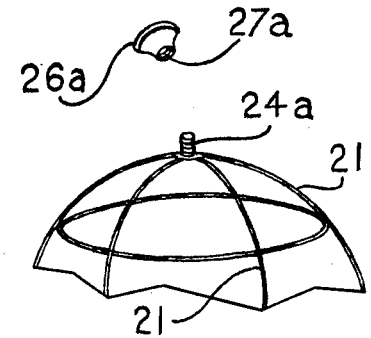
FIG. 2a is a perspective of a broken away portion of a top of the framework of FIG. 2 and knob showing an alternative fastening means.

With attention drawn to FIG. 2a it will be noted that a threaded stud 24a may be attached at the juncture of the elements 21 rather than the nut 24 as shown in FIG. 2. In this case, the knob 26a, will have a threaded hole 27a suitable to accommodate the stud 24a.

Figure 3:
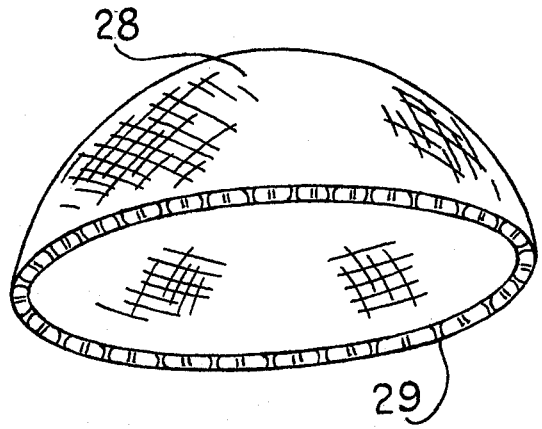
FIG. 3 is a perspective of the cover for the framework of FIG. 2.

FIG. 3 illustrates a fabric or other resilient cover comprised of a fire resistant material such as fire resistant cloth or the like, 28 having a means 29 by which the bottom of the cover will be held snuggly about the base element 22 of FIG. 2. This means 29 may be an elastic band, a draw string, or other such item as is known to those skilled in the art.

The cover may be formed strictly as shown, and when applied a hole is then made through its top by the screwing of stem 27 into the threaded hole 25, or by the screwing of knob 26a onto the stub 24a. This will be understood by those skilled in the art.

Figure 3A:
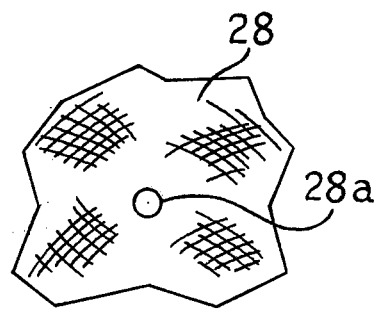
FIG. 3a is a broken away portion of a top of the cover of FIG. 3 showing an alternate construction.

FIG. 3a shows an alternate means to form the hole in the top cover and this would be particularly true if it was desired to save the cover for repeated use rather than to dispose of it. In this case, a stitched hole or the like 28a would be provided in the cover 28 in order to present a firm and tear resistant hole.

FIGS. 4 and 5 are perspective views of an alternative embodiment of the framework. The base element 32 has affixed thereto at least one arching element 31. The method affixing the arching element 31 to the base element 32 could be by use of a rivet 37 or other acceptable means. If two arching elements 31 were used, they could cross at approximately a right angle directly above the axis of the base element. The arching element 31 could be affixed by use of a rivet, or the like, or by use of a bolt 33 with threads exposed upward. In cooperation with the threaded bolt, a heat resistant, non-heat conductive know 34, could be used as a handle for the assembly. The knob could be affixed after the disposable cover 55 was placed over the framework 30 and the disposable cover would contain a hole which would tightly fit around bolt 33.

Retractable legs 40 could be affixed to the base element 32 so as to be pivotally moved around pivot point 41 in the direction of 42 or 42a. The purpose of the retractable legs is to allow one to elevate the base element 32 above the bottom of frying pan 20 so that cover 55 would not be directly resting in grease which will accumulate in the bottom of the frying pan. A slot in the cover 55 as shown by 58 would allow one to extend the legs after the cover 55 was in place.

Swivel arms 50 could also be affixed to base element 32. These arms could pivot around pivot point 51a supported by support member 51 in a horizontal plane in the direction 52 or 52a. The purpose of the arms is to allow the base element to be used with a frying pan of larger or smaller size. If the arms point inward, see 60 of FIG. 5, the base element can be placed over frying pans of a smaller diameter. If the arms point inward, see 60 of FIG. 5, the base element can be placed over frying pans of a smaller diameter. If the arms point outward, see 70 of FIG. 5, the base element can be placed within frying pans of a larger diameter. A slot could allow the arm to be pivoted outward 70 when the cover 55 was in place.

The perimeter of the base element can also be varied by use of the perforations 35 and the cooperative pins 36 in a manner similar to a simple belt, see FIG. 5.

The covers 28 (FIG. 3) and 55 (shown in the other figures) will be essentially identical, each having been formed from a resilient, non-heat conductive, fire resistant material. Certain papers have been treated so as to make them fire resistant would be suitable, and such are known in the art. Also, certain inexpensive cloths, also treated to be fire resistant, will suffice. These are known to those skilled in the art. Depending upon the quality of the cover, a relatively permanent cover may be made which can be removed for laundering. Otherwise the covers may merely be disposed of when they have become sufficiently soiled.

The covers would normally have an elastic or the like at their lower circumferance as shown at 29 and 57 so that the cover will fit in place over the frame.

Figure 8:
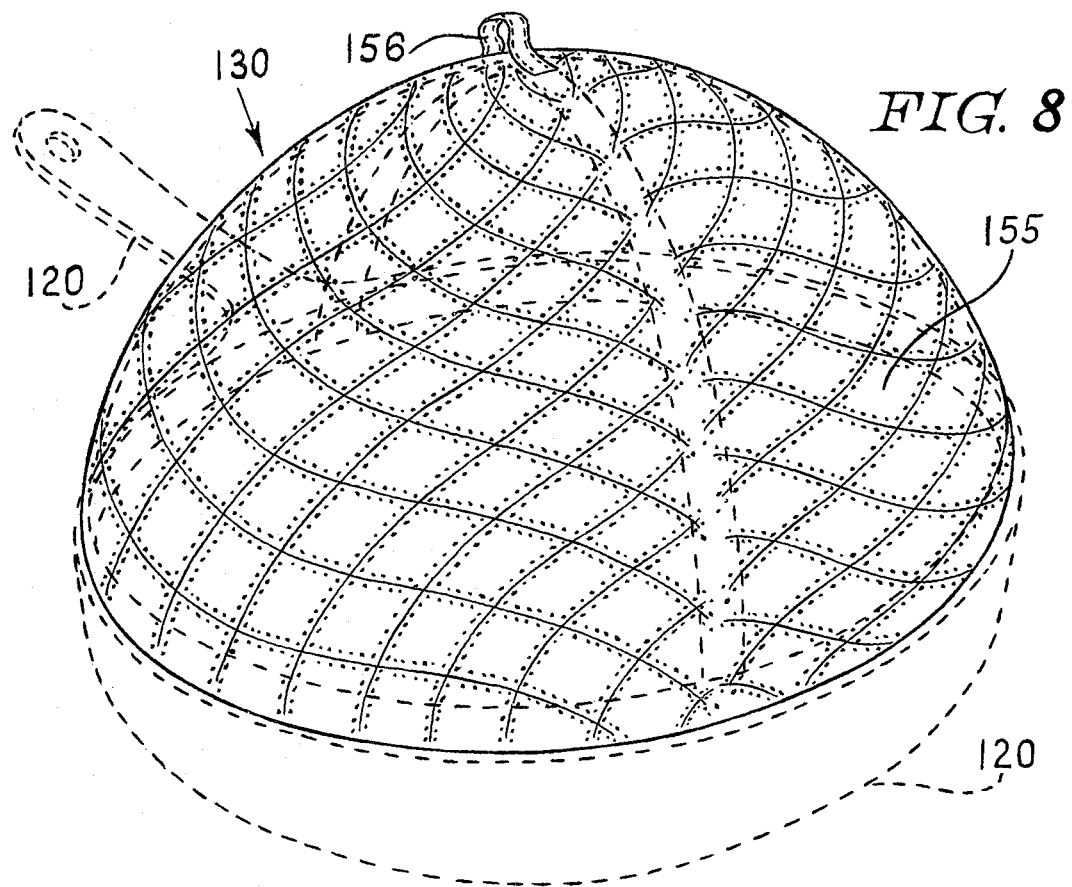
FIG. 8 is a perspective of another embodiment in place within a frying pan shown in phantom.
Figure 9:
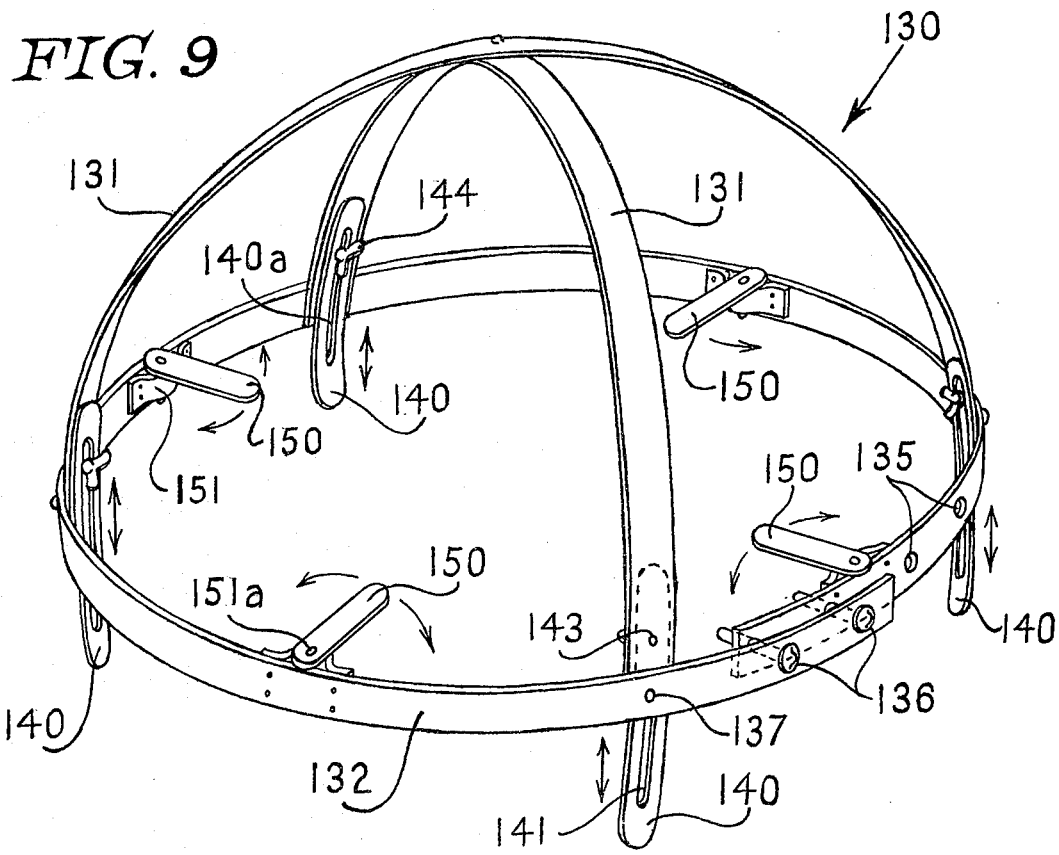
FIG. 9 is a perspective of an alternate framework utilized in the embodiment of FIG. 8.

Another frame assembly is shown in FIGS. 8 and 9. This frame assembly has been made similar to the embodiment of FIGS. 4 and 5, but in this case legs 140 being slotted as shown, and having wing nuts or the like to hold them in a fixed position with respect to frame numbers 131 have been provided. In this case, it will not be necessary to have slots provided in the cover in order to use legs, as they will be so shaped as to slide up and down on the inner portion of the members 131 and thus will not interfere with the fastening of the cover about the base hoop 132. This will be adjustable by the pins 136 through holes 135 as may be desired, and the pivot arms 150 through 151 will allow the placement on smaller pans than the outer diameter.

The pins 137 will provide a guide for the legs 140 operating through slots 141. The wing nuts 144 will operate on threaded studs or the like attached at 143 to the frame members 131 as will be understood by those skilled in the art. In this embodiment, if desired, as well as in the other embodiments, the cover material 155 will have a fabric loop or the like, 156 attached to it for purposed of lifting the device. The overall device 130 is shown in place within the pan 120 in phantom outline.

While the embodiments of this invention specifically shown and described are fully capable of achieving the objects and advantages desired, it is to be understood that such embodiments have been shown solely for purposes of illustration, and not for purposes of limitation.

I claim:

1. A fire protection grease catcher for preventing splatterings from articles being cooked in pans comprising: an arching framework cooperative with a cooking utensil so as to enclose foods being cooked therein; a non metalic fire resistant flexible removable covering upon said framework; means removably securing the base of said cover about said framework; and lifting means from said frame through said cover to lift said framework and covering from their cooperative relationship with the cooking utensil.

2. The device of claim 1 wherein the framework comprises: a circular base element and at least two arched elements connected to said circular element and extending for a distance from said circular elements and connected to each other threaded means; handle means containing threaded means cooperative with the threaded means joining said arched elements; fabric covering means covering said arched elements; and means cooperative with said cover and said circular wire means so as to hold said cover upon said framework.

3. The device of claim 2 wherein the circular comprises an elongated element strip which contains a plurality of holes and fastener means cooperative with said holes to increase or decrease the perimeter of the circular element.

4. The device of claim 3 wherein at least three retractable legs cooperative with said framework for the purpose of elevating the framework in reference to the bottom of a cooking utensil.

5. The device of claim 4 wherein the circular element cooperatively mounts at least three swivel arms, containing no spring element, and pivotal in a horizontal plane, said swivel arms being used to rest on the edge of a cooking utensil of a greater or lesser perimeter than the circular element.

* * * * *